United States Patent [19]

Rivetti et al.

[11] Patent Number: 5,059,663
[45] Date of Patent: Oct. 22, 1991

[54] LIQUID COMPOSITION POLYMERIZABLE INTO ORGANIC GLASSES OF HIGH REFRACTIVE INDEX

[75] Inventors: Franco Rivetti, Milan; Fiorenzo Renzi, Gorgonzola, both of Italy

[73] Assignee: Enichem Synthesis S.p.A., Palermo, Italy

[21] Appl. No.: 561,793

[22] Filed: Aug. 2, 1990

[30] Foreign Application Priority Data

Aug. 3, 1989 [IT] Italy .................... 21440 A/89

[51] Int. Cl.$^5$ .................... C08F 4/36
[52] U.S. Cl. .................... 526/230.5; 526/292.9; 526/261; 526/313; 526/314; 526/293
[58] Field of Search ........... 526/292.3, 292.6, 292.9, 526/314, 293, 261, 250.5, 313

[56] References Cited

U.S. PATENT DOCUMENTS

| | | | |
|---|---|---|---|
| 4,602,075 | 7/1986 | Kida et al. | 526/293 |
| 4,622,376 | 11/1986 | Misura et al. | 526/286 |
| 4,623,705 | 11/1986 | Romano et al. | 526/75 |
| 4,644,025 | 2/1987 | Sakagami et al. | 526/261 |
| 4,812,545 | 3/1989 | Renzi et al. | 526/230.5 |

FOREIGN PATENT DOCUMENTS 0142118 5/1985 European Pat. Off. .
61-83212 4/1986 Japan .

*Primary Examiner*—Joseph L. Schofer
*Assistant Examiner*—M. Nagumo
*Attorney, Agent, or Firm*—Hedman, Gibson, Costigan & Hoare

[57] ABSTRACT

A liquid composition stable during storage and polymerizable radically into organic glasses having a high refractive index, containing:

(A) from 20 to 80% wt of a mixture of monomer and oligomers of a carbonic allyl derivative representable by the formula (I):

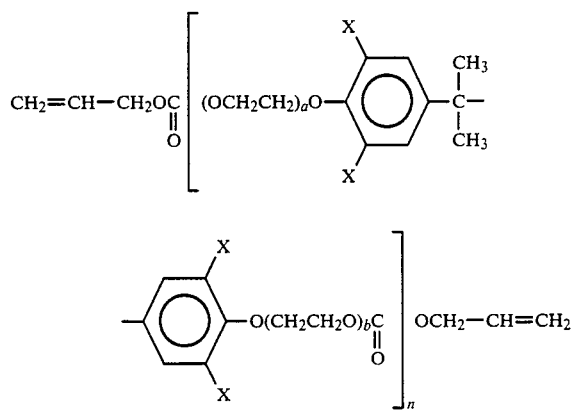

where:
X = halogen (except fluorine);
a and be independently assume the values 1 or 2;
n assumes values from 1 to 5 on condition that at least 10% by weight of the mixture consists of carbonic allyl oligomer derivatives (n > 1); and (B) from 80 to 20% by weight of a liquid monomer copolymerizable with the component (A) and chosen from diallyl isophthalate, diallyl terephthalate, triallyl cyanurate and triallyl isocyanurate.

8 Claims, No Drawings

LIQUID COMPOSITION POLYMERIZABLE INTO ORGANIC GLASSES OF HIGH REFRACTIVE INDEX

This invention relates to a polymerizable liquid composition which is stable during storing and can be transformed into organic glasses having a high refractive index. The invention also relates to the organic glasses obtained from said polymerizable composition.

In the organic glass field, products resulting from the polymerization of di ethyleneglycol bis(allylcarbonates) are interesting because of their optical and mechanical characteristics, which enable them to be used in the preparation of optical articles (F. Strain, "Encyclopedia of Chemical Processing and Design", vol 1, Interscience Publishers, New York, 1964, p. 799 onwards).

However in preparing optical articles from these polymerized products, relatively larger thicknesses are required than in the case of inorganic glass articles because of the relatively low refractive index of the polymerized products. This is a drawback in terms of the article weight, the diminished appearance and the difficulty of obtaining high optical quality in the case of large thickness articles.

Thus with a view to overcoming these problems compositions able to form polymerized products with a relatively high refractive index have been conceived in the art. With regard to the carbonic allyl derivative sector these compositions of the known art generally comprise polymerizable monomers having an aromatic portion, such as the bisphenol bis(allyl carbonates) or their ethoxylated derivatives as described for example in U.S. Pat. No. 4,622,376.

To obtain the greatest possible increase in refractive index, halogenated and especially brominated bisphenolic derivatives are used, and in particular tetrabromo bisphenol-A or its ethoxylated derivatives, definable by the formula:

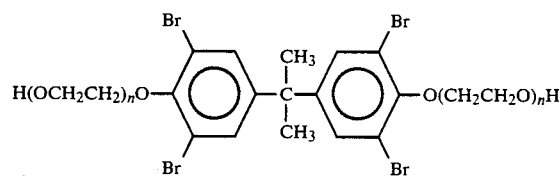

where n is zero, one or two.

The organic glasses obtained from these compositions suffer from the drawback of accentuated fragility, low impact strength and poor workability, making their use in the ophthalmic field problematic. To mitigate these problems it has been proposed to use polymerizable compositions containing additional aliphatic or monofunctional carbonic allyl derivatives such as described in CA 105 7576n (Japanese patent application 60-231,712), CA 105 7577p (Japanese patent application 60-231,713), and CA 105 80.818h (Japanese patent application 61-23,657). However instability phenomena appear in these compositions, with gradual phase separation, and when such phenomena arise the composition becomes unusable in practice. This phase separation problem has been confronted in the art, and in particular European patent application publication No. 142,118 proposes compositions which in addition to the halogenated bisphenol derivative, contain an aliphatic allyl carbonate and a mixed aliphatic-aromatic allyl carbonate. However, although these compositions are little inclined towards phase separation phenomena, they have the drawback of reduced refractive index because of the introduction of aliphatic and mixed monomers.

The object of the present invention is to obviate the aforesaid drawbacks by a polymerizable liquid composition stable during storage and transformable into organic glasses of high refractive index having good impact strength and good workability, without requiring the addition of aliphatic polymerizable compounds to the composition.

More particularly, the liquid composition stable during storage and polymerizable radically into organic glasses having a high refractive index contains:

(A) from 20 to 80% wt. of a mixture of monomer and oligomers of a carbonic allyl derivative representable by the formula (I):

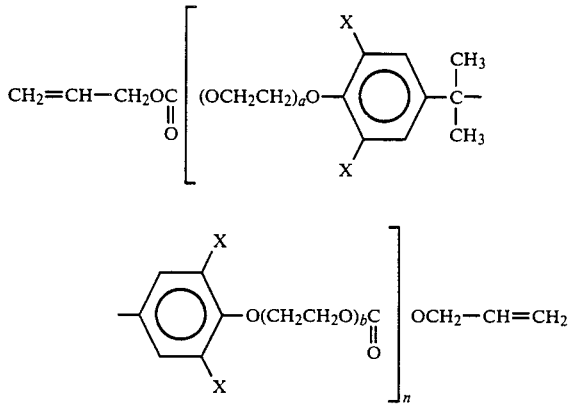

where:

$X$ = halogen (except fluorine);

$a$ and $b$ independently assume the values 1 or 2;

$n$ assumes values from 1 to 5 on condition that at least 10% by weight of the mixture consists of carbonic allyl oligomer derivatives ($n > 1$); and (B) from 80 to 20% by weight of a liquid monomer copolymerizable with the component (A) and chosen from diallyl isophthalate, diallyl terephthalate, triallyl cyanurate and triallyl isocyanurate.

In the preferred embodiment the component (A) is a mixture of tetrabromo bisphenol A diethoxylate bis(allylcarbonate) monomer and oligomers, corresponding to formula (I) where $X = Br$ and $a = b = 1$, in which the oligomer ($n > 1$) content varies from 15 to 50% by weight.

The compositions of the present invention preferably contain from 35 to 65 weight % of component (A) and from 65 to 35 weight % of component (B).

Component (A) of the composition of the present invention can be conveniently obtained by a transesterification reaction between the respective diol and the diallyl carbonate in the presence of a basic catalyst, operating for example in accordance with the general lines of the transesterification procedure described in European patent No. 35,304. When operating under those conditions, a mixture of carbonic allyl monomer ($n = 1$) and oligomer ($n > 1$) derivatives is obtained in which the proportion varies depending on the ratio of allyl carbonate to diol. In particular, component (A) used in the present invention can be obtained by transesterification of diallyl carbonate and the diol in a molar ratio of less than about 20/1 and preferably between 12/1 and 4/1. The use of a monomer/oligomer mixture in component (A) of the composition is essential for obtaining a composition with no tendency towards phase separation during storage and which can be transformed into organic glasses having desirable characteristics. In this respect if component (A) is substantially monomeric (n=1), as in the known art, the composition is subject to phase separation and precipitation after only a short period of storage, especially at relatively low temperature. In addition the polymerized products obtained from compositions containing such a monomeric component (A) are undesirably fragile.

The composition of the present invention also contains a polymerization initiator in a quantity of between 2 and 8 parts by weight per 100 parts by weight of the sum of components (A) and (B). These initiators are soluble in the composition and are able to generate free radicals within a temperature range of between about 30° and about 100° C. Non-limiting examples of such initiators are diisopropyl peroxy dicarbonate, dicyclohexyl peroxy dicarbonate, di-sec-butyl peroxy dicarbonate, dibenzoyl peroxide and tert-butyl perbenzoate. In the preferred embodiment the polymerization initiator is present in the composition in a quantity of between 3 and 5 parts by weight per 100 parts by weight of the sum of components (A) and (B).

The polymerizable liquid composition of the present invention can additionally contain one or more conventional additives such as stabilizers, separation agents, dyes, pigments, ultraviolet and infrared light absorbents and the like, in a total quantity not exceeding 1 part by weight per 100 parts by weight of the sum of components (A) and (B).

The polymerizable liquid composition of the present invention is transformed into optical articles by polymerization by casting. The polymerization is initiated by free radicals generated by the decomposition of the polymerization initiators added to the compound, operating generally at a temperature of between 35° and 100° C. Under these conditions the time required for complete polymerization is between 2 and 100 hours. The articles obtained in this manner have a high refractive index, a low light dispersion and good colour values and mechanical characteristics, as is apparent from the experimental examples given hereinafter as non-limiting illustration of the present invention.

In these examples, the polymerizable liquid compositions are prepared, the polymerization initiator in the form of dicyclohexyl peroxy dicarbonate is added, and the resultant compositions are polymerized in glass moulds assembled with a flexible plasticized polyvinylchloride gasket which determines the thickness of the polymeric article. Polymerization is conducted in a water bath with a polymerization cycle lasting 20 hours, at a temperature of between 40° and 80° C.

The following characteristics are determined on the hardened specimens obtained in this manner:

refractive index [$n_D^{20}$] and dispersion factor, measured with an Abbe refractometer (ASTM D-542);

% of Haze and transmittance in the visible range, measured by a Gardner Hazegard XL-211 of (ASTM D-1003);

yellow index (YI) defined as:

$$YI = (100/Y)(1.277X - 1.06Z),$$

measured by a Gardner colorimeter XL-805 (ASTM D-1925);

density, determined by a hydrostatic balance at a temperature of 25° C. (ASTM D-792);

Rockwell hardness (M) measured by a Rockwell durometer (ASTM D-785);

ultimate bending strength and elastic bending modulus, measured by an INSTRON dynamometer (ASTM D-790);

Izod impact strength, unnotched (ASTM D-256, modified);

heat distortion temperature (HDT) (ASTM D-648).

EXAMPLE 1

Preparation of component (A)

2,2-bis(4-hydroxyethoxy-3,5-dibromophenyl)propane bis(allyl carbonate) (mixture of monomer and oligomers)

632 g (1.0 mole) of tetrabromo bisphenol A diethoxylate, 1704 g (12 moles) of diallyl carbonate and 1.4 g of a 30 wt % solution of sodium methylate in methanol are fed into a 3-neck jacketed flask fitted with a thermometer and mechanical stirrer and surmounted by a distillation column comprising 20 perforated plates. The molar ratio of the diallyl carbonate to the tetrabromo bisphenol A diethoxylate is therefore 12:1. The reaction is conducted for 90 minutes at a temperature of 115° C. and a pressure of 150 torr, distilling off the allyl alcohol formed during the transesterification (overhead column temperature 58°-60° C.). 116 g of allyl alcohol are collected with a purity exceeding 99%.

The reaction mixture is then cooled and washed twice with 500 ml portions of distilled water to remove the alkalinity. The excess diallyl carbonate is then distilled off under reduced pressure (1 torr) with the temperature increasing up to 120° C. The distillation residue is a viscous oil, 790 g, containing 0.2 wt % of residual diallyl carbonate, and having a viscosity of 95 cps at 120° C. and an APHA colour of 20-30, and containing the following monomer and oligomer percentages:

monomer (n=1): 83% by weight
dimer (n=2): 15% by weight
trimer (n=3): 2% by weight, the determination being done by HPLC analysis (% area).

EXAMPLE 2

The procedure of Example 1 is repeated using 1136 g of diallyl carbonate to obtain a molar ratio of diallyl carbonate to tetrabromo bisphenol-A diethoxylate of 8:1.

A product, 770 g, is obtained containing 0.2 wt % of residual diallyl carbonate, and having a viscosity of 115 cps at 120° C. and an APHA colour of 20-30, and with the following monomer and oligomer content:

monomer (n=1): 75% by weight
dimer (n=2): 20% by weight
trimer (n=3): 4% by weight,
tetramer (n=4): 1% by weight the determination being done by HPLC analysis (% area).

EXAMPLE 3

The procedure of Example 1 is repeated using 568 g of diallyl carbonate to obtain a molar ratio of diallyl carbonate to tetrabromo bisphenol-A diethoxylate of 4:1.

A product of weight 753 g is obtained containing 0.2 wt % of residual diallyl carbonate, and having an APHA colour of 20 and the following monomer and oligomer content:
- monomer (n=1): 55% by weight
- dimer (n=2): 30% by weight
- trimer (n=3): 10% by weight
- tetramer (n=4): 3% by weight
- pentamer (n=5): 1% by weight, the determination being done by HPLC analysis (% area).

EXAMPLE 4

Comparison

The procedure of Example 1 is repeated using 1704 g (12 moles) of diallyl carbonate and 158 g (0.25 moles) of tetrabromo bisphenol-A diethoxylate, with a reagent molar ratio of 48:1. 204 g of a product are obtained having an APHA colour of 30, and containing 97% wt of monomer (n=1).

EXAMPLES 5-8

Example 8 being for comparison

In these examples the products prepared in Examples 1 to 4 are used as component (A) and are indicated by A1, A2, A3 and A4 respectively. Diallyl isophthalate of 99.8% purity and an APHA colour of 5 is used as component (B). Polymerizable liquid compositions are prepared having the characteristics given in Table 1.

TABLE 1

| Ex. No. | A1 | A2 | A3 | A4 | B | Viscosity (cst) | Density (g/ml) | $n_D^{20}$ | Colour (APHA) |
|---|---|---|---|---|---|---|---|---|---|
| 5 | 50 | — | — | — | 50 | 175 | 1.3420 | 1.5492 | 15 |
| 6 | — | 50 | — | — | 50 | 184 | 1.3445 | 1.5495 | 20 |
| 7 | — | — | 50 | — | 50 | 328 | 1.3583 | 1.5527 | 10 |
| 8 | — | — | — | 50 | 50 | 165 | 1.3370 | 1.5470 | 20 |

The compositions are kept at 2° C. for 7 days. At the end of this period no phase separation or precipitation is observed for the compositions of Examples 5, 6 and 7 according to the invention.

The composition of Example 8 however shows massive precipitation of the mixture in the form of a white crystalline solid. A similar behaviour is observed if the samples are kept at ambient temperature.

Dicyclohexyl peroxy dicarbonate as polymerization initiator is then added to the compositions in a quantity of 3.5% by weight in the resultant mixture and the compositions are polymerized to form flat plates having a thickness of 3 mm, operating in the described manner. The characteristics given in Table 2 are then determined on the plates obtained.

TABLE 2

| Ex. No. | 5 | 6 | 7 | 8 |
|---|---|---|---|---|
| Density (23° C.; g/ml) | 1.4505 | 1.4515 | 1.4577 | 1.4437 |
| Shrinkage (%) | 7.4 | 7.2 | 6.8 | 7.4 |
| Refractive index ($n_D^{20}$) | 1.5820 | 1.5835 | 1.5835 | 1.5803 |
| Dispersion factor | 33 | 32 | 32 | 32 |
| Yellow index (YI) | 5.2 | 5.2 | 4.8 | 5.3 |
| Haze (%) | 0.4 | 0.4 | 0.18 | 1.40 |
| Visible transmittance (%) | 91 | 90 | 91 | 89 |
| Rockwell hardness (M) | 118 | 116 | 117 | 117 |
| HDT (°C.) | 95 | 90 | 90 | 93 |
| IZOD impact, unnotched (kJ/m$^2$) | 9 | 12 | 14 | 9 |
| Elastic bending modulus (MPa) | — | 4,700 | — | — |
| Ultimate bending strength (MPa) | — | 149 | — | — |

EXAMPLES 9 and 10

In these examples the components (A) of Examples 1 and 2 are used, indicated by A1 and A2 respectively. Diallyl terephthalate of 99.8% purity and an APHA colour of 5 is used as component (B). Polymerizable liquid compositions are prepared having the characteristics given in Table 3.

TABLE 3

| Ex. No. | A1 | A2 | B | Viscosity (cst) | Density (g/ml) | $n_D^{20}$ | Colour (APHA) |
|---|---|---|---|---|---|---|---|
| 9 | 50 | — | 50 | 138 | 1.3415 | 1.5500 | 15 |
| 10 | — | 50 | 50 | 149 | 1.3455 | 1.5510 | 20 |

The two compositions are kept at 2° C. for 7 days. At the end of this period no phase separation or precipitation is observed. Dicyclohexyl peroxy dicarbonate as polymerization initiator is then added to the compositions in a quantity of 3.5% by weight in the resultant mixture. This mixture is converted into flat plates operating in the aforedescribed manner, the plate characteristics being given in Table 4.

TABLE 4

| Ex. No. | 9 | 10 |
|---|---|---|
| Density (23°C.; g/ml) | 1.4473 | 1.4473 |
| Shrinkage (%) | 7.3 | 7.0 |
| Refractive index ($n_D^{20}$) | 1.5835 | 1.5838 |
| Dispersion factor | 32 | 32 |
| Yellow index (YI) | 4.5 | 3.8 |
| Haze (%) | 0.5 | 0.4 |
| Visible transmittance (%) | 91 | 90 |
| Rockwell hardness (M) | 117 | 115 |
| HDT (°C.) | 97 | 90 |
| IZOD impact, unnotched (kJ/m$^2$) | 7 | 7 |

EXAMPLE 11

In this example component (A) is that of Example 2 (50 wt %) and component (B) is a mixture of diallyl isophthalate (40 wt %) and triallyl cyanurate (10 w %). The resultant composition has the following characteristics:
- Viscosity (25° C.) = 219.5 cst
- Density (20° C.) = 1.3497 g/ml
- Refractive index [$n_D^{20}$] = 1.5483.

3.5 parts by weight of dicyclohexyl peroxy dicarbonate are then added to the composition per 100 parts by weight of the composition, which is then converted into flat plates operating in the aforedescribed manner, the following characteristics then being determined on the plates:

| Dispersion factor | 33.5 |
|---|---|
| Rockwell hardness (M) | 118 |
| Refractive index [$n_D^{20}$] | 1.5822 |
| Density (23° C.; g/ml) | 1.4587 |
| impact strength (edgewise) (kJ/m$^2$) | 6 |
| HDT (°C.) | 99 |
| Shrinkage (%) | 7.5 |
| Elasting bending modulus (MPa) | 4650 |
| Ultimate bending strength (MPa) | 98.5 |

We claim:

1. A liquid composition stable during storage and polymerizable radically into organic glasses having a high refractive index consisting essentially of:
   (A) from 20 to 80 percent by weight of a mixture of monomer and oligomers of a carbonic allyl derivative representable by the formula (I):

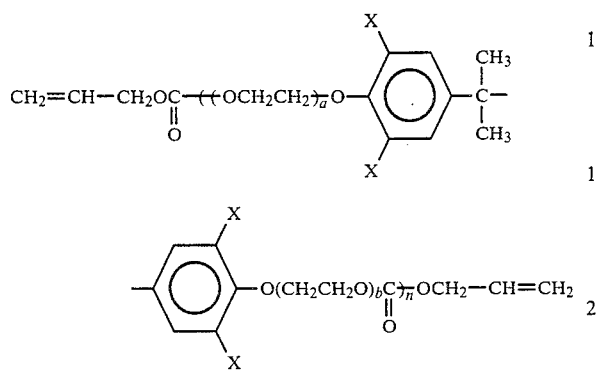

where:
X = halogen (except fluorine);
a and b are independently 1 or 2;
n is from 1 to 5 on condition that at least 10% by weight of the mixture consists of carbonic allyl oligomer derivatives (n > 1); and
   (B) from 80 to 20 percent by weight of a liquid monomer copolymerizable with said component (A) and selected from the group consisting of diallyl isophthalate, diallyl terephthalate, triallyl cyanurate and triallyl isocyanurate;
wherein aliphatic polymerizable compounds are excluded from the composition.

2. A composition as defined in claim 1, wherein component (A) is a mixture of tetrabromo bisphenol A diethoxylate bis(allyl carbonate) monomer and oligomers, corresponding to formula (I) wherein X = Br and a = b = 1, in which the oligomer (n > 1) content varies from 15 to 30% by weight. (n > 1) content varies from 15 to 30% by weight.

3. A composition as defined in claim 1, consisting essentially of from 35 to 65 percent by weight of said component (A) and from 65 to 35 percent by weight of said component (B).

4. A composition as defined in claim 1, further consisting essentially of between 2 and 8 parts by weight per 100 parts by weight of the sum of components (A) and (B), of a polymerization initiator able to generate free radicals at a temperature of between about 30° and about 100° C.

5. A composition as defined in claim 4, wherein the amount of initiator ranges from 3 to 5 parts by weight per 100 parts by weight of the sum of components (A) and (B).

6. A composition as defined in claim 4, wherein said initiator is selected from the group consisting of diisopropyl peroxy dicarbonate, dicyclohexyl peroxy dicarbonate, di-sec-butyl peroxy carbonate, dibenzoyl peroxide and tert-butyl perbenzoate.

7. A composition as defined in claim 1, further consisting essentially of one or more additives selected from the group consisting of stabilizers, separation agents, dyes, pigments and ultraviolet or infrared light absorbents, in a total quantity not exceeding 1 part by weight per 100 parts by weight of the sum of components (A) and (B).

8. Organic glasses obtained by polymerization of the composition claimed in claim 1 by casting.

* * * * *